(12) United States Patent
Riley et al.

(10) Patent No.: US 8,195,654 B1
(45) Date of Patent: Jun. 5, 2012

(54) PREDICTION OF HUMAN RATINGS OR RANKINGS OF INFORMATION RETRIEVAL QUALITY

(75) Inventors: Michael Dennis Riley, New York, NY (US); Corinna Cortes, New York, NY (US)

(73) Assignee: Google Inc., Mountain View, CA (US)

( * ) Notice: Subject to any disclaimer, the term of this patent is extended or adjusted under 35 U.S.C. 154(b) by 446 days.

(21) Appl. No.: 11/160,872

(22) Filed: Jul. 13, 2005

(51) Int. Cl.
*G06F 7/00* (2006.01)

(52) U.S. Cl. ........ 707/726; 707/727; 707/728; 707/734; 707/944; 706/12

(58) Field of Classification Search .................. 707/723, 707/726–728, 734, 944; 706/12
See application file for complete search history.

(56) References Cited

U.S. PATENT DOCUMENTS

| | | | |
|---|---|---|---|
| 5,787,424 A * | 7/1998 | Hill et al. | 1/1 |
| 6,012,053 A * | 1/2000 | Pant et al. | 1/1 |
| 6,546,388 B1 * | 4/2003 | Edlund et al. | 1/1 |
| 7,346,839 B2 | 3/2008 | Acharya et al. | |
| 7,716,225 B1 | 5/2010 | Dean et al. | |
| 8,001,118 B2 | 8/2011 | Dean et al. | |
| 2001/0011270 A1 * | 8/2001 | Himmelstein et al. | 707/3 |
| 2002/0143630 A1 * | 10/2002 | Steinman et al. | 705/14 |
| 2003/0153299 A1 * | 8/2003 | Perfit et al. | 455/410 |
| 2004/0215606 A1 * | 10/2004 | Cossock | 707/3 |
| 2005/0120006 A1 * | 6/2005 | Nye | 707/3 |
| 2005/0125390 A1 * | 6/2005 | Hurst-Hiller et al. | 707/3 |
| 2005/0154686 A1 * | 7/2005 | Corston et al. | 706/12 |
| 2006/0004891 A1 * | 1/2006 | Hurst-Hiller et al. | 707/204 |
| 2007/0005568 A1 * | 1/2007 | Angelo et al. | 707/3 |

OTHER PUBLICATIONS

Freund et al, "An Efficient Boosting Algorithm for Combining Preferences", Journal of Machine Learning Research, No. 4, 2003, p. 933-969.*

Thorsten Joachims, "Evaluating Retrieval Performance using Clickthrough Data", SIGIR workshop on Mathematical/Formal Methods in Information Retrieval, Tampere, Finland, Aug. 2002.*

Iyer et al. "Boosting for Document Routing", in Proceedings of the Ninth International Conference on Information and Knowledge Management, McLean, VA, USA, Nov. 6-11, 2000, p. 70-77.*

Toms et al., "Augmenting and Limiting Search Queries", Eleventh Text Retrieval Conference (TREC 2002), Nov. 19-22, 2002, 10 pages.

Jung et al., "SERF: Integrating Human Recommendations with Search", Thirteenth ACM Conference on Information & Knowledge Management, Nov. 8-13, 2004, pp. 571-580.

* cited by examiner

*Primary Examiner* — Vei-Chung Liang
(74) *Attorney, Agent, or Firm* — Harrity & Harrity, LLP

(57) ABSTRACT

A statistical model may be created that relates human ratings of documents to objective signals generated from the documents, search queries, and/or other information (e.g., query logs). The model can then be used to predict human ratings/rankings for new documents/search query pairs. These predicted ratings can be used to, for example, refine rankings from a search engine or assist in evaluating or monitoring the efficacy of a search engine system.

52 Claims, 8 Drawing Sheets

| | 605 ↓ | 610 ↓ | 615 ↓ |
|---|---|---|---|
| 600 | SEARCH QUERY | SEARCH RESULT | RELEVANCE RATING |
| | ⋮ | ⋮ | ⋮ |
| | MATERNITY CLOTHES | <DOC IDENTIFER 1> | 2 |
| | MATERNITY CLOTHES | <DOC IDENTIFER 2> | 3 |
| | MATERNITY CLOTHES | <DOC IDENTIFER 3> | 3 |
| | MATERNITY DRESS | <DOC IDENTIFER 4> | 0 |
| | ⋮ | ⋮ | ⋮ |
| | PIZZA | <DOC IDENTIFER 5> | 1 |
| | ⋮ | ⋮ | ⋮ |

PREDICTION OF HUMAN RATINGS OR RANKINGS OF INFORMATION RETRIEVAL QUALITY

BACKGROUND

A. Field of the Invention

Implementations consistent with the principles of the invention relate generally to information retrieval and, more particularly, to improving results of search engines.

B. Description of Related Art

Search engines assist users in locating desired portions of information from a document corpus. A general web search engine, for instance, catalogs web pages and, in response to a user's request, returns the answer directly or to a set of references to documents relevant to the request. A search engine may also be a more specialized search engine, such as a local search engine, which, given a search request and a geographic location, returns results, such as business listings, that are relevant to the search request and that are located near the geographic location.

Search engines may base their determination of relevance on search terms (called a search query) entered by the user. The goal of the search engine is to identify high quality relevant results based on the search query. Typically, the search engine accomplishes this by matching the terms in the search query to a corpus of pre-stored documents. Documents that contain the user's search terms are considered "hits" and are returned to the user. The set of hits is typically very large and needs to be prioritized or ranked before being returned to the user.

The hits returned by the search engine are typically sorted based on relevance to the user's search terms. Determining the correct relevance, or importance, of a document to a user, however, can be a difficult task. For one thing, the relevance of a document to the user is inherently subjective and depends on the user's interests, knowledge, and attitudes. There is, however, much that can be determined objectively about the relative importance or quality of a document. One existing technique of determining relevance is based on matching a user's search terms to terms indexed from the documents. Other existing techniques attempt to objectively measure the quality of a document based on more than the content of the web page. For example, in the context of a linked set of documents, one prior technique for measuring quality assigns a degree of importance to a document based on the link structure of the set of documents.

The quality of a search engine may be assessed by humans rating the relevance of the top documents returned by the search engine in response to a query. For a search engine, returning the most relevant documents to the user is of paramount importance. Thus, any improvement to the ability of a search engine to return relevant results is desirable.

SUMMARY

One aspect is directed to a method that includes receiving a group of search query/search result pairings and generating, for each of the pairings, a set of objective signals derived from the pairings. The method further includes obtaining a relevance evaluation for each of the pairings from a human evaluator, where the relevance evaluations measure a relevance of the search query to the corresponding search result of the pairing. Still further, the method includes training a statistical model, based on the obtained relevance evaluations and the set of objective signals, to predict a relevance evaluation for another search query/search result pairing.

Another aspect is directed to a computer-implemented method for performing a search. The method includes receiving a search query, identifying documents relevant to the search query, and obtaining signals based on the search query and the identified documents. The method further includes obtaining predicted relevance evaluations for the documents based on the signals, where the predicted relevance evaluations are obtained from a statistical model trained on the signals and on human generated relevance evaluations. Additionally, the method includes ranking the documents based on the predicted relevance ratings.

Yet another aspect is directed to a method of assessing an effectiveness of a search engine. The method includes submitting search queries to the search engine; identifying documents relevant to the search query from the search engine; obtaining signals based on the search query and the identified documents; and obtaining predicted relevance evaluations for the identified documents based on the signals, where the predicted relevance evaluations are obtained from a statistical model trained on the signals and on human generated ratings. The method further includes assessing the effectiveness of the search engine based on the predicted relevance evaluations.

Yet another aspect is directed to a search engine comprising a processor and a memory including processing instructions for execution by the processor. The instructions include instructions to calculate a group of signals based on input document/search query pairs; instructions to obtain relevance ratings for the document/search query pairs, the relevance ratings predicting a level of relevance that a human user would assign the document/search query pairs; and instructions for using the relevance ratings to refine a ranking of the input documents of the input documents/search query pairs.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The detailed description does not limit the invention.

Overview

Techniques are described herein in which human estimated or predicted evaluations are used to directly rank or assist in ranking search engine results. The predicted human ratings may also be used to indirectly improve search engine results by assisting in the evaluation of the results of the search engines.

Figures 1A, 1B:
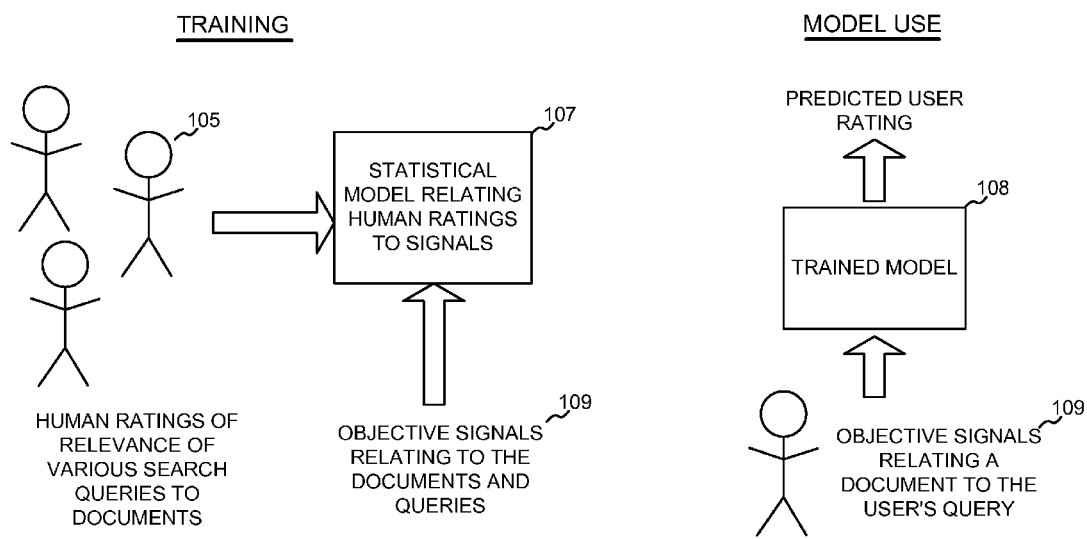
FIGS. 1A and 1B are diagrams conceptually illustrating an exemplary implementation of the techniques described herein.

FIGS. 1A and 1B are diagrams conceptually illustrating an exemplary implementation of the techniques described herein. In general, human ratings relating to document/search query pairings may be used to train a statistical model (FIG. 1A). Once trained, the model may be used to automatically generate predicted user ratings of new documents/search query pairings (FIG. 1B).

As illustrated in FIG. 1A, a number of human evaluators 105 may provide ratings of various documents to search queries. For example, a human evaluator may be shown a web page that corresponds to the home page of the store "Home Depot" and asked to rate how relevant this web page is to the search query "home improvement store." The human evaluator may provide their rating as, for example, a number within a range (e.g., 1-5). A number of such ratings, possibly collected from numerous human evaluators shown numerous search query/document pairings, may be collected.

For each of the search query/document pairings, one or more "signals" 109 may be automatically generated based on the particular search query/document pairing. The signals can include, for example, an indication of the portion of the search query that matches a link to the document or whether the search query matches a business name or category associated with the document. These two signals are exemplary. Additional signals, some of which are described in more detail below, can be used. A statistical model 107 may be generated relating the human ratings to the signals.

FIG. 1B generally illustrates operation of the trained version of statistical model 107, shown as trained model 108. Trained model 108, given signals 109 for a particular document and search query, generates predicted ratings. Ideally, the predicted ratings will match the evaluator ratings that a human would typically assign to the document/search query pairing. The predicted ratings could be used in a number of applications, such as to rank documents that are to be returned from a search engine or to evaluate the results of search engines.

Exemplary System Overview

Figure 2:
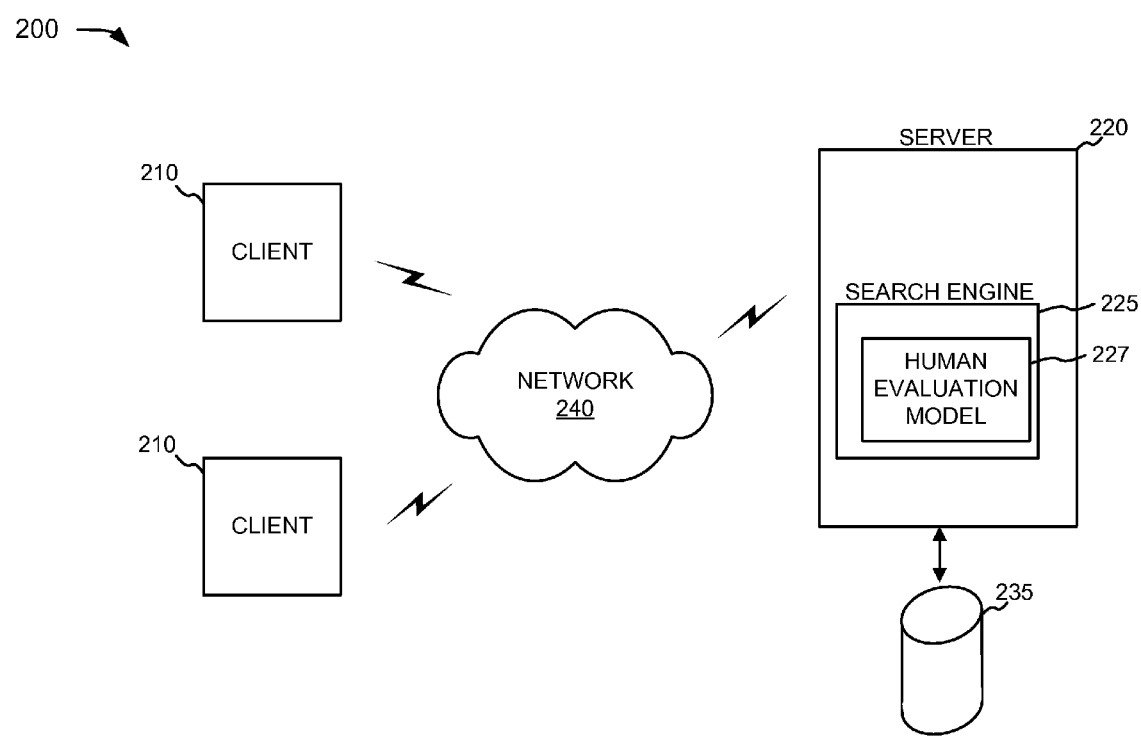
FIG. 2 is a diagram of an exemplary network in which systems and methods consistent with the principles of the invention may be implemented.

FIG. 2 is an exemplary diagram of a network 200 in which systems and methods consistent with the principles of the invention may be implemented. Network 200 may include clients 210 connected to a server 220 via a network 240. Network 240 may include a local area network (LAN), a wide area network (WAN), a telephone network, such as the Public Switched Telephone Network (PSTN), an intranet, the Internet, or a combination of networks. Two clients 210 and one server 220 have been illustrated as connected to network 240 for simplicity. In practice, there may be more clients and/or servers. Clients 210 and server 220 may connect to network 240 via wired, wireless, or optical connections.

A client 210 may include a device, such as a personal computer, a wireless telephone, a personal digital assistant (PDA), a lap top, or another type of computation or communication device, a thread or process running on one of these devices, and/or an object executable by one of these devices. Server 220 may include a server device that processes, searches, and/or maintains documents. The documents may be maintained in database 235.

Server 220 may include a search engine 225 usable by clients 210. In one implementation, search engine 225 may be a local search engine designed to return documents having local relevance to the users. In other implementations, search engine 225 may be a general web search engine. Search engine 225 may include or be associated with a human evaluation model 227, which may generally be used to assist search engine 225 in returning relevant documents to clients 210. The operation of human evaluation model 227 in the context search engine 225 will be described in more detail below.

The documents processed by search engine 225 may be indexed and stored in a data structure, such as database 235. When search engine 225 operates as a local search engine, the documents in database 235 may be local documents in the sense that they are associated with a particular geographic area—though not necessarily the same geographic area. A document that relates to a business listing, for example, can be considered a local document because it is associated with the particular address of the business.

A document, as the term is used herein, is to be broadly interpreted to include any machine-readable and machine-storable work product. A document may be an e-mail, a business listing, a file, a combination of files, one or more files with embedded links to other files, a news group posting, etc. In the context of the Internet, a common document is a web page. Web pages often include content and may include embedded information (such as meta information, hyperlinks, etc.) and/or embedded instructions (such as Javascript, etc.).

Figure 3:
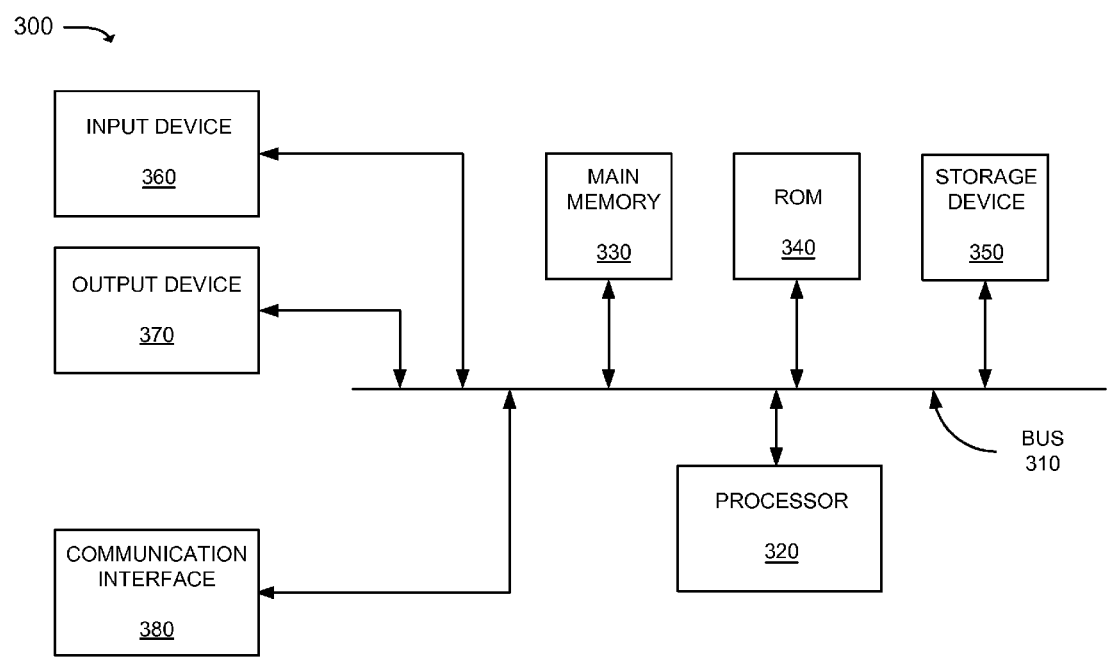
FIG. 3 is an exemplary diagram of a computing device shown in FIG. 2.

FIG. 3 is an exemplary diagram of a client 210 or server 220, referred to as device 300, according to an implementation consistent with the principles of the invention. Device 300 may include a bus 310, a processor 320, a main memory 330, a read only memory (ROM) 340, a storage device 350, an input device 360, an output device 370, and a communication interface 380. Bus 310 may include a path that permits communication among the components of device 300.

Processor 320 may include any type of conventional processor, microprocessor, or processing logic that may interpret and execute instructions. Main memory 330 may include a random access memory (RAM) or another type of dynamic storage device that stores information and instructions for execution by processor 320. ROM 340 may include a ROM device or another type of static storage device that stores static information and instructions for use by processor 320. Storage device 350 may include a magnetic and/or optical recording medium and its corresponding drive.

Input device 360 may include a mechanism that permits a user to input information to device 300, such as a keyboard, a mouse, a pen, voice recognition and/or biometric mechanisms, etc. Output device 370 may include a mechanism that outputs information to the user, including a display, a printer, a speaker, etc. Communication interface 380 may include any transceiver-like mechanism that enables device 300 to communicate with other devices and/or systems. For example, communication interface 380 may include mechanisms for communicating with another device or system via a network, such as network 240.

Server 220, consistent with the principles of the invention, performs certain searching or document retrieval related operations through search engine 225 and/or human evaluation model 227. Search engine 225 and/or human evaluation model 227 may be stored in a computer-readable medium, such as memory 330. A computer-readable medium may be defined as one or more physical or logical memory devices and/or carrier waves.

The software instructions defining search engine 225 and/or human evaluation model 227 may be read into memory 330 from another computer-readable medium, such as data storage device 350, or from another device via communication interface 380. The software instructions contained in memory 330 cause processor 320 to perform processes that will be described later. Alternatively, hardwired circuitry may be used in place of or in combination with software instructions to implement processes consistent with the present invention. Thus, implementations consistent with the principles of the invention are not limited to any specific combination of hardware circuitry and software.

Exemplary Operation of Human Evaluation Model in the Context of Local Search

Search engine 225, when operating as a local search engine, may return documents, such as business listings, that are relevant to a search query and to a specific geographic area. For example, if a user enters the search query "pizza" and the zip code 10012 (New York city), search engine 225 may return a list of pizza restaurants in or near this zip code. When returning the results to the user, search engine 225 may sort the results based on relevance of the listing to the search query and also based on a geographic location of the business to the user. Ideally, the most relevant business listings that are close to the user should be returned first or higher in the search results.

Human evaluation model 227 may assist search engine 225 in determining the relevance of a document (i.e., a business listing) to the user search query. Before being used in a "live" search engine, human evaluation model 227 is first trained.

Figure 4:
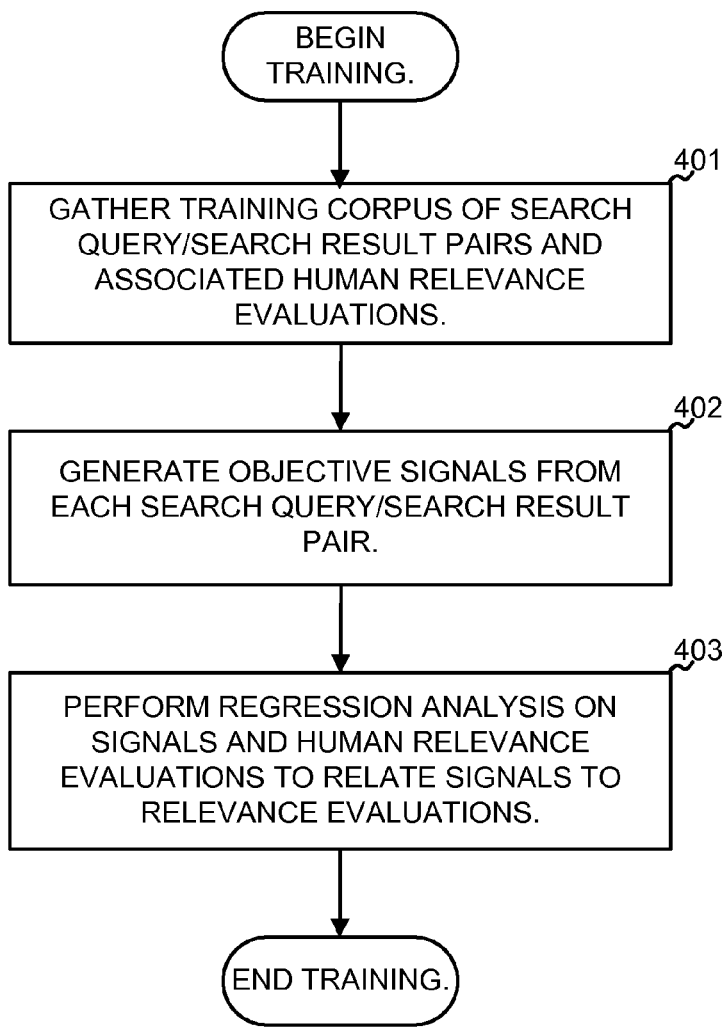
FIG. 4 is a diagram illustrating exemplary operations for training the human ratings model shown in FIG. 2.

FIG. 4 is a diagram illustrating exemplary operations for training human evaluation model 227. A training corpus of search query and local search result pairs may be generated (act 401). Each pair in the corpus may be manually rated by a human (act 401).

Figure 5:
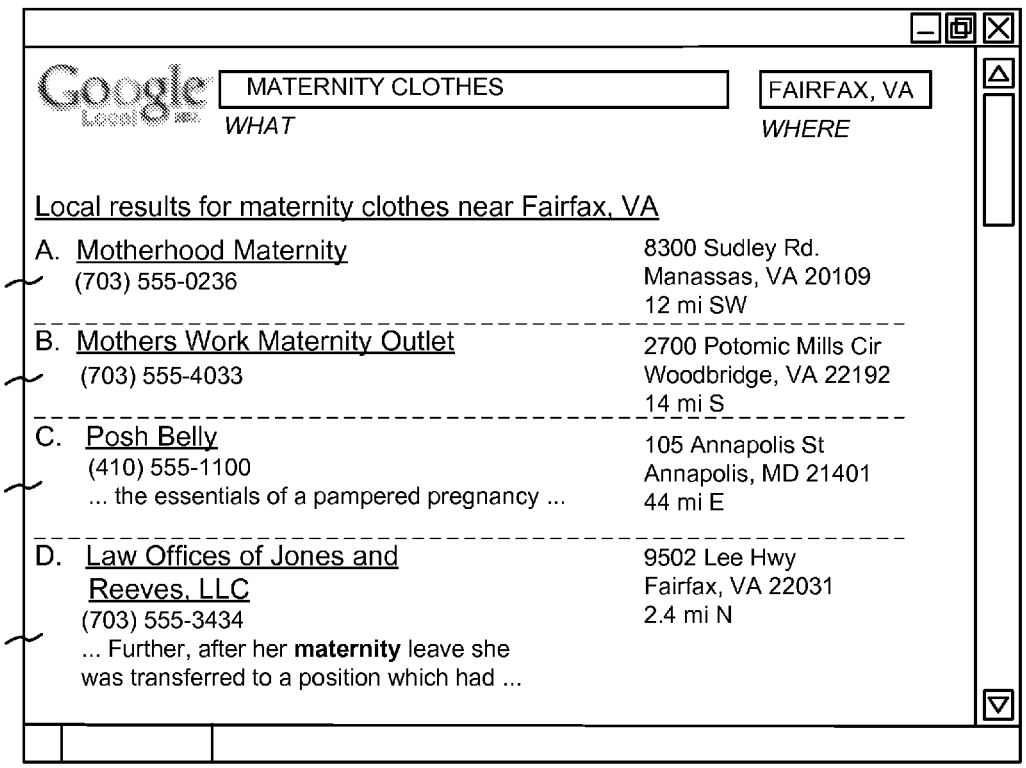
FIG. 5 is a diagram illustrating exemplary local search results for an exemplary search query.

FIG. 5 is a diagram illustrating exemplary local search results 501-504 for a search query "maternity clothes." As shown, for this search query and the geographic limitation of "Fairfax, Va.," each result 501-504 is a business listing of a business that the search engine determined to be relevant to the user search query.

Each resultant directory listing 501-504, when coupled with the search query, may define a search query/search result pair. Accordingly, four different search result pairs can be created from the documents shown in FIG. 5: search result 501 and the search query "maternity clothes;" search result 502 and the search query "maternity clothes;" search result 503 and the search query "maternity clothes;" and search result 504 and the search query "maternity clothes." In some implementations, the geographic limitation field may be assumed to be a part of the search query.

As mentioned, the search query/search result pairs may be evaluations by a human evaluator for their relevance to one another. The human evaluator may evaluate the search query/search result pairs by rating the pairs on any convenient scale, such as by rating each pair on a scale from zero to three, where three is defined as the most relevant and zero is defined as the least relevant. In the example shown in FIG. 5, for instance, when rating the results, a typical human evaluator may give directory listings 501 and 502 a relevancy score of three, as these two listings are for stores that specialize in selling maternity clothes, which are likely to be highly relevant to someone entering the search query "maternity clothes." A human evaluator is likely to give directory listing 503 a relevancy score less than three, such as a score of one, as this listing is for a business that caters to pregnant women, but does not specialize in selling maternity clothes. Listing 504 is likely to receive a relevance rating of zero from the human evaluator, as a law office is not likely to be relevant to a person searching for maternity clothes.

In other implementations, the human evaluator, instead of subjectively rating the search query/search result pairs via a rating value, may subjectively evaluate the search query/search result pairs using other techniques, such as by ranking a number of search results for relevance to a search query. Instead of rating listings 501-504 on a scale of zero to three, the human evaluator may rank listings 501-504 by ordering the listings in an order that the human evaluator believes goes from most relevant to least relevant to the search query.

Figures 6, 7:
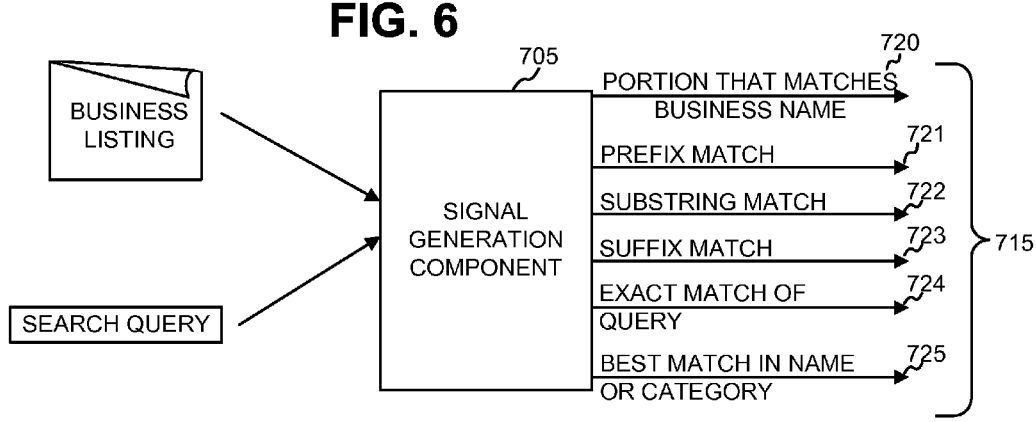
FIG. 6 is a diagram of a table illustrating an exemplary corpus of search query/search result pairs and their human assigned relevance ratings.
FIG. 7 is a diagram illustrating generation of an exemplary set of signals for input to the human ratings model.

FIG. 6 is a diagram of a table 600 illustrating an exemplary corpus of search query/search result pairs and their human assigned relevance ratings. Each row of table 600 associates a search query 605 with a search result 610 and the relevance rating (or, in alternate implementations, a relevance ranking) 615 that was assigned by a human. Search results 610 may be stored in table 600 as any convenient document identifier, such as a document Uniform Resource Locator (URL), a hash value that identifies the document, or as the full version of the document. Relevance ratings 615 may each define, for example, a single rating polled from a single human evaluator or an average of multiple ratings polled from multiple evaluators. In practice, the training corpus may be relatively large, and table 600 may include entries for hundreds or thousands (or more) of search query/search result pairs and their human assigned relevance ratings. In one implementation, the training corpus may be generated by randomly picking a certain number of queries (e.g., 5000) and asking human evaluators to evaluate the top ten results returned by search engine 225 (using any conventional search query to document content matching techniques) for each of the queries.

Referring back to FIG. 4, signals may be determined for each of the search query/search result pairs (i.e., each of the rows in table 600) in the training corpus (act 402). The signals may generally be based on the search query and its associated search result document.

FIG. 7 is a diagram illustrating generation of an exemplary set of signals. A set of signals 715 is generated by a signal generation component 705 based on a particular input document (i.e., business listing) and search query. Signal generation component 705 may generate a similar set of signals 715 for each search query/search result pair in the training corpus. Signals 715 are chosen for particular relevance to a local search engine and, as shown, include individual signals 720-725.

Signal 720 may be represented as a value that defines the number of words in the search query that match the business name associated with the search result document. In one implementation, this signal may have a value ranging from zero to one, in which one indicates that all the words in the search query match the business name and zero indicates none of the words in the search query match the business name. In FIG. 5, for example, one word from the two words in the search query "Maternity Clothes" match the business name "Motherhood Maternity," giving signal 720 for this pairing a value of 0.5.

One of ordinary skill in the art will recognize that numerous techniques, in addition to the example given above, could be used to generate a value that generally measures a portion of the terms in a search query that match a business name. Also, in addition to or instead of matching the search query terms to the business name, the search query terms could be matched to the name of a category associated with the search query. Categories are commonly associated with business listings returned in local search results. A pizza restaurant may, for example, be listed in the category "restaurants" and the sub-category "Italian restaurants."

Signals 721-723 may indicate whether the search query matches a prefix portion of the business name, is a substring of the business name, or matches a suffix portion of the business name, respectively. As a specific exemplary example of implementations of signals 721-723, signals 721-723 may be assigned a value of one for a match and a value of zero if there is no match. For example, if the search query is "Lowe's" or "Lowe" and a business name is stored as "Lowe's Home Improvement," the search query matches the prefix portion of the business name and is a substring of the business name. Accordingly, signals 721 and 722 may be assigned the value of one and signal 723 assigned the value of zero. On the other hand, if the search query is "home improvement" and the business name is stored as "Lowe's Home Improvement," the search query matches the suffix portion of the business name and is a substring of the business name. Accordingly, signals 722 and 723 may be assigned the value of one and signal 721 assigned the value of zero.

Signal 724 may indicate whether the search query exactly matches the business name. For example, a search query for "Home Depot" exactly matches the business name "Home Depot," and accordingly, in this situation, signal 724 may be given the value one. If, however, the search query was "Home Depot garden" and the business name is "Home Depot," the signal may be given the value zero.

Signal 725 may indicate whether the best match of the search query to the business listing is to the business name or to the category name in which the business is listed. Signal 725 may, for example, be given a value of one when the best match is to the business name and a value of zero when the best match is to the category name.

One of ordinary skill in the art will recognize that signals 721-725 in signal set 715 are exemplary. Other signals based on the search query, the result document, and possibly other information, could be generated and included in signal set 715. In particular, one class of signals that could additionally be included in signal set 715 are signals that will be referred to herein as dynamic signals. The dynamic signals may be signals derived from prior local search sessions that are observed by search engine 225. For example, certain user clicking actions in response to a set of search results may indicate that a resultant business listing is a "good" business listing for the corresponding search query. Quickly clicking on a business listing or clicking on a phone number link, directions link, or other link associated with the business listing may indicate that the business listing is "good." Dynamic signals may be derived by identifying "good clicks" and, for example, then using the frequencies relating to clicks associated with queries, business categories, and their co-occurrences as signals in the signal set. Dynamic signals are also described in more detail below with reference to FIG. 9.

In general, when deciding which signals to include in signal set 715, it is better to error on the side of over-including many signals rather than under-including signals, as signals that are statistically not relevant to the human relevance ratings/rankings tend to be recognized by the model and deemphasized.

A regression (or ranking) analysis may next be performed on the generated signals and the corresponding human relevance ratings/rankings (act 403). In one implementation, linear regression using the least squares method of measuring error may be used in which the signals in signal set 715 are the independent (X) variables and the human relevance ratings are the dependent (Y) variable. Other regression analysis techniques could also be used, such as, without limitation, logistic regression, Poisson regression, or other supervised learning techniques. The result of the regression analysis may be a number of weights that define how future values of a signal set 715 are to be combined to generate a predicted relevance rating for the signal set. These weights thus define the trained human evaluation model 227.

Figure 8:
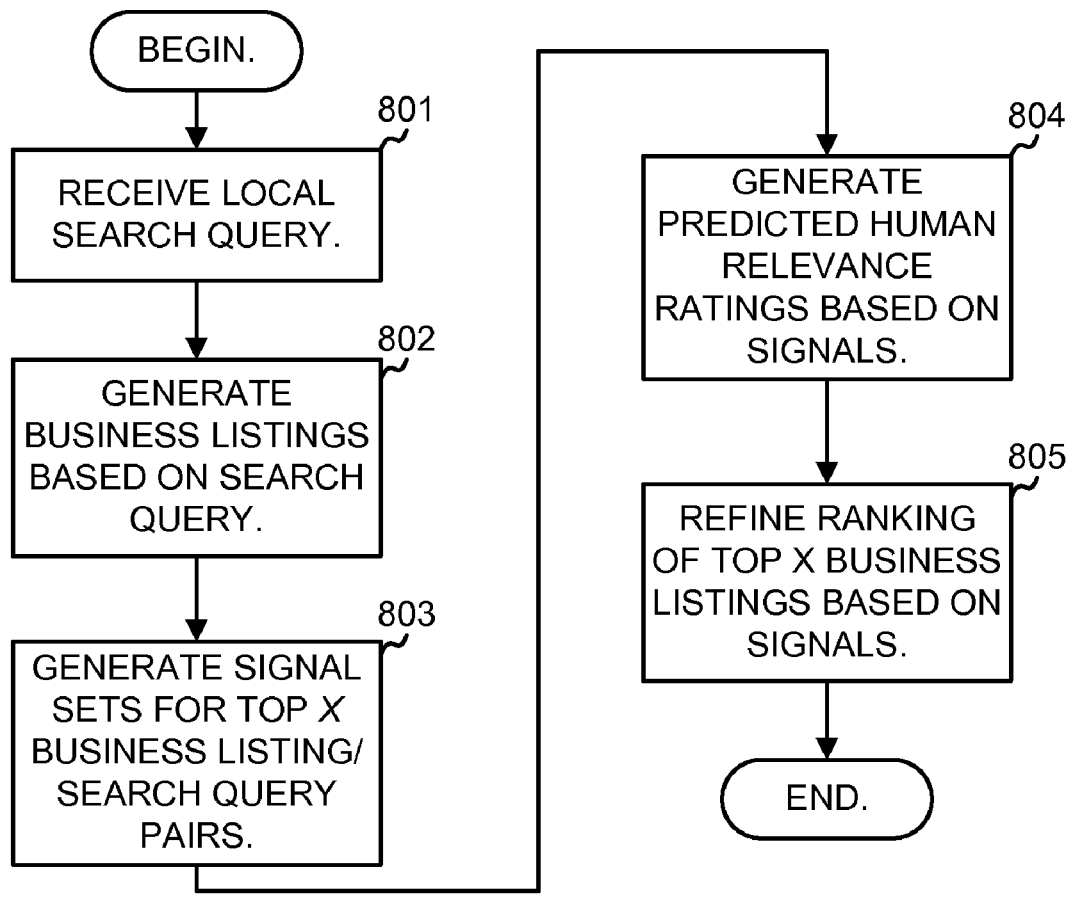
FIG. 8 is a flow chart illustrating exemplary operations in which the human ratings model shown in FIG. 2 is used to assist in ranking local search results generated by a search engine.

FIG. 8 is a flow chart illustrating exemplary operations in which human evaluation model 227 is used to assist in ranking local search results generated by search engine 225. To begin, a local search query may be received by search engine 225 (act 801). Search engine 225 may generate an initial set of search results (e.g., business listings) based on the search query and based on geographic location information received with or as a part of the query (act 802). The initial set of search results may be generated using existing information retrieval techniques in which the terms in the search query are matched to an inverted index generated from the business listings. The initial set of search results may be ranked in an initial ranking order determined based, for example, on how well the terms of the search query match the terms of the business listings. Techniques for initially ranking documents for relevance to a search query based on how well the terms of the search query match the documents, called information retrieval scoring techniques, are well known in the art. Such techniques can generate a metric called an information retrieval (IR) score that defines how well the terms of a search query match the document.

Signal generation component 705 may generate a signal set 715 for each of the top X search query/business listing pairs, where X is an integer greater than one (act 803). The generated signal sets 715 should match the signal set used when training human evaluation model 227. The trained human evaluation model 227 may generate predicted human relevance ratings/rankings based on the generated signal sets (act 804). In the context of the example described above, the predicted human relevance ratings may be a number between zero and three (i.e., the range used by the human evaluators) associated with each of the X business listings. The predicted human relevance ratings may then be used to refine the initial ranking of the X business listings (act 805). In implementation, the X business listings may simply be resorted based on the predicted human relevance ratings. The re-ranked business listings may be provided to the user that submitted the search query. Ideally, the most relevant business listings should be presented higher in the list of search results.

The operations described with the reference to the flow chart of FIG. 8 generally relate to refining or re-ranking results of a search engine. In alternate embodiments, the results of the search engine could be initially ranked based on the predicted relevance ratings. For example, the search engine may return a set of unordered documents that match the search query. A predicted relevance rating could be calculated for each of the documents and then used to rank the documents.

Exemplary Operation of Human Ratings Model in the Context of a General Web Search Engine Human evaluation model 227, in addition to being applicable in the context of a local search engine, can also be applied in the context of a general search engine, such as a general web search engine. In this implementation, the model used for human evaluation model 227 may be trained in a manner described with reference to FIG. 4. However, in this implementation, the documents that define the search results (act 401) may typically include web pages and a different signal set may be used in act 402.

Figure 9:
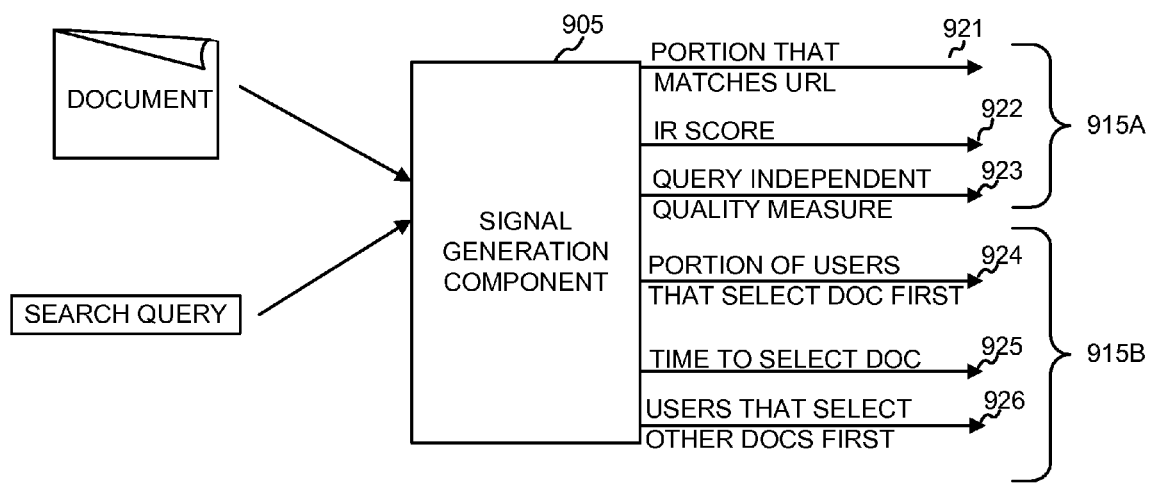
FIG. 9 is a diagram illustrating generation of an exemplary set of signals for a human ratings model when used in the context of a general search engine.

FIG. 9 is a diagram illustrating generation of an exemplary set of signals for human evaluation model 227 when used in the context of a general search engine. A set of signals 915 may be generated by a signal generation component 905 based on a particular input search result document and search query. Signal generation component 905 may generate a similar set of signals 915 for each search query/search result pair in the training corpus. Signals 915 may include signals based on static features 915A and signals based on dynamic features 915B.

The signals based on static features 915A may include signals 921-923. Signal 921 may be represented as a value that defines a portion of the search query that is contained within the URL of the web page. For example, if every term of the search query is contained within the URL, this signal may be given a value of one while if no terms of the search query are contained within the URL, this signal may be given a value of zero. Signal 922 may represent the IR score between the search query and the web page. Signal 923 may represent a query-independent quality measure of the web page, such as, for example, a link-based value computed for the web page.

The signals based on dynamic features 915B may include and may generally be derived from the aggregate behavior observed of human evaluators interacting with a set of documents returned to them in response to a search query. Search engine 225 may keep track of and store this behavior in "click logs." The click logs could be compiled based on user behavior that is anonymous and may be obtained with consent from the users. Dynamic features 915B may include signals 924-926, which may be based on information in the click logs for a particular search query, such as information defining a particular sequence of user clicks and the time durations between the clicks. The time duration between clicks can be used as an approximation of the time a user spent examining a document. For example, signal 924 may be a value indicating, for the document/search query pair, what portion of the users select the document first when it is returned to the user in a list of search results. Signal 925 may define how long it takes (i.e., the duration between when a user first views the result document set and selects the document) an average user to select the document when it is returned to the user at a particular location in a list of search results or how long a user spends viewing the document based on the sequence of user click times. Signal 926 may define the fraction of users that first selected another document before selecting this document.

One of ordinary skill in the art will recognize that signals 921-926 are exemplary and that numerous other signals based on similar concepts could be generated and used.

As with training of the human evaluation model 227 in the context of a local search engine, in the context of a web search engine, a regression or ranking analysis may next be performed on the generated signal set 915 and the corresponding human relevance ratings/rankings (act 403). A linear regression or other regression technique may be used. The result of the regression analysis may be a number of weights that define how future values of signal set 915 are to be combined to generate a predicted relevance rating for the signal set. These weights thus define the trained human evaluation model 227.

In one implementation, human evaluation model 227 may be used to refine rankings of potentially relevant web pages in a manner similar to how human evaluation model 227 may be used to refine ranking of potentially relevant business listings. In another implementation, human evaluation model 227 may be used to assess the quality of results returned from web search engine 225 and/or the quality of results returned from a modification to web search engine 225. For example, before web search engine 225 is modified to include a potentially new search technique, such as to include a new information retrieval score system, human evaluation model 227 can be used to automatically predict human relevance ratings/rankings for a large number of novel query-URL pairs, and can hence be used to assess the quality of the new information retrieval score system.

CONCLUSION

As described above, a statistical model may be created that relates human ratings of documents to objective signals generated from the documents, search queries, and/or other information (e.g., query logs). The model can then be used to predict human ratings/rankings for novel documents/search query pairs. These predicted ratings/rankings can be used to, for example, refine rankings from a search engine or assist in evaluating or monitoring the efficacy of a search engine system.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, although concepts consistent with the invention were generally described in the context of a local search engine or a general web search engine, the concepts could be generally applied to any type of search engine, such as a product search engine, a news (or story) search engine, or an email search engine.

Moreover, while a series of acts have been described with regard to FIGS. 4 and 8, the order of the acts may be varied in other implementations consistent with the invention. Moreover, non-dependent acts may be implemented in parallel.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "components" or "models" that performs one or more functions. This elements may be implemented as hardware, such as an application specific integrated circuit or a field programmable gate array, software, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by one or more server devices, the method comprising:
   receiving, by one or more processors associated with the one or more server devices, a plurality of search query/search result document pairings,
   where each search query/search result document pairing, of the plurality of search query/search result document pairings, includes a search query and a search result document responsive to the search query, and where the search result documents, of the search query/
search result document pairings, are associated with
business listings that are relevant to the search queries of
the search query/search result document pairings;
generating, by one or more processors associated with the
one or more server devices, for each of the search query/
search result document pairings, objective data derived
from the search query/search result document pairings,
where the objective data, for a particular one of the search
query/search result document pairings that comprises a
particular search query and a particular search document, includes:
first data indicating whether a term in the particular
search query matches a prefix portion of a name of a
business, of a particular business listing of the business listings, the prefix portion including less than an
entirety of the name of the business, and
second data indicating whether the particular search
query exactly matches the name of the business;
obtaining, by one or more processors associated with the
one or more server devices, information associated with
a relevance evaluation for each of the search query/
search result document pairings from a human evaluator,
the relevance evaluation indicating a relevance of a
search query to a corresponding search result document;
and
training, by one or more processors associated with the one
or more server devices, an evaluation model, based on
the obtained information associated with relevance
evaluations and the objective data, to predict a human
relevance evaluation that is used to rank another search
query/search result document pairing.

2. The method of claim 1, where the objective data further includes:
third data relating to a number of terms in the particular search query that match the name of the business.

3. The method of claim 1, where the objective data further includes at least one of:
third data indicating whether a term in the particular search query is a substring of the name of the business; or
fourth data indicating whether a term in the particular search query matches a suffix portion of the name of the business.

4. The method of claim 1, where the objective data further includes:
third data indicating whether the particular search query best matches the name of the business or best matches a category of the particular business listing.

5. The method of claim 1, where the search result documents include web documents that are relevant to the search queries.

6. The method of claim 5, where the objective data further includes at least one of:
third data relating to a number of terms in the particular search query that match a uniform resource locator (URL) of the web document;
fourth data representing an information retrieval score associated with the particular search query and a web document; or
fifth data representing a query-independent quality measure of the web document.

7. The method of claim 1, where the objective data further includes:
data obtained from historical logs of search activity.

8. The method of claim 1, further comprising:
training the evaluation model based on regression analysis techniques.

9. The method of claim 1, further comprising:
receiving a plurality of other search query/search result document pairings;
predicting, using the trained evaluation model, human relevance evaluations for the plurality of other search query/search result document pairings; and
ranking the plurality of other search query/search result document pairings based on the predicted human relevance evaluations.

10. The method of claim 1, where the objective data further includes at least one of:
third data that is based on a value indicating a portion of users that selected the particular search document before selecting another search document associated with the particular search query,
fourth data that is based on a value indicating a portion of users that select the particular search document after selecting one or more other search documents associated with the particular search query, or
fifth data that is based on a time between when search documents, associated with the particular search query, are presented, and when the particular search document is selected.

11. The method of claim 1, where the particular search document comprises a web document, and
where the objective data further includes a link-based value computed for the particular search document.

12. A computer-implemented method for performing a search, the method comprising:
receiving, at a device, a search query;
identifying, by the device, documents relevant to the search query,
where the identified documents include business listings;
obtaining, by the device, data based on the received search query and the identified documents,
where the obtained data includes:
first data indicating whether the received search query exactly matches a name of a business in the business listings, and
second data indicating whether a term in the search query matches a suffix portion of the name of the business, the suffix portion including less than an entirety of the name of the business;
obtaining, by the device, predicted human relevance evaluations for the documents based on the obtained data, the predicted human relevance evaluations being obtained from a evaluation model based on the obtained data and based on information associated with human generated relevance evaluations, to predict a relevance evaluation that a human user would assign a particular document based on a corresponding search query,
where the human generated relevance evaluations include rating scores, assigned by one or more human evaluators, indicative of a relevance of the identified documents to the received search query;
ranking, by the device, the identified documents based on the obtained predicted human relevance evaluations; and
presenting the ranked documents.

13. The method of claim 12, where the search query is a local search query.

14. The method of claim 10, where the obtained data further includes:
third data relating to a portion of terms in the search query that match the name of the business.

15. The method of claim 12, where the obtained data further includes one or more of:

third data indicating whether a term in the search query matches a prefix portion of the name of the business; or fourth data indicating whether a term in the search query is a substring of the name of the business.

16. The method of claim 12, where the obtained data further includes one or more of:

third data indicating whether the search query best matches the name of the business or best matches a category of the business; or fourth data representing an information retrieval score associated with the search query and a document that is included in the identified documents that is associated with the business.

17. The method of claim 12, where the documents further include web documents.

18. The method of claim 17, where the obtained data further includes at least one of:

third data relating to a number of terms in the search query that match a uniform resource locator (URL) of a particular web document, of the web documents;

fourth data representing an information retrieval score associated with the search query and the particular web document; or fifth data representing a query-independent quality measure of the particular web document.

19. The method of claim 12, where ranking the identified documents further comprises:

sorting the identified documents based on the obtained predicted human relevance evaluations.

20. The method of claim 12, where the obtained data further includes:

data obtained from historical logs of search activity.

21. The method of claim 12, where the obtained data further includes at least one of:

third data that is based on a value indicating a portion of users that selected a particular document, from the identified documents, before selecting another document from the identified documents, fourth data that is based on a value indicating a portion of users that select the particular document, from the identified documents, after selecting one or more other documents, from the identified documents, or fifth data that is based on a value associated with a time between when the identified documents are presented and when selection of the particular document, from the identified documents, is detected.

22. The method of claim 17, where the obtained data further includes a link-based value computed for a particular document, of the identified documents.

23. A physical memory device including instructions, executable by one or more processors, to perform a method, the method comprising:

submitting at least one search query to a search engine;

identifying documents relevant to the at least one search query from the search engine, where the identified documents include web documents;

obtaining data based on the at least one search query and the identified documents, where the obtained data includes:

data that is based on a value indicating a portion of users that selected a document, from the identified documents, before selecting another document from the identified documents; and obtaining, based on the obtained data, predicted human relevance evaluations to rank the identified documents, the predicted relevance evaluations being obtained from an evaluation model based on the obtained data and based on information associated with human generated evaluations, where the evaluation model is trained to predict a human relevance evaluation of a particular document to a corresponding search query.

24. The physical memory device of claim 23, the method further comprising:

assessing an effectiveness of the search engine based on the predicted human relevance evaluations, where assessing the effectiveness of the search engine includes:

comparing the predicted human relevance evaluations to predicted relevance evaluations that were previously generated for the search engine or generated for a different implementation of the search engine.

25. The physical memory device of claim 23, where the submitted at least one search query include search queries that were not used in training the evaluation model.

26. The physical memory device of claim 23, where the evaluation model is trained further based on a regression analysis technique.

27. The physical memory device of claim 23, where the obtained data further includes at least one of:

data obtained from historical logs of search activity, or data associated with a time between when the identified documents are presented and when selection of the document, from the identified documents, is detected.

28. The physical memory device of claim 23, where the information associated with the human generated evaluations comprises:

information associated with an average of a plurality of ratings, assigned by a plurality of evaluators, indicating the relevance of the identified documents to the submitted at least one search query.

29. The physical memory device of claim 23, the method further comprising:

assessing an effectiveness of the search engine based on the predicted human relevance evaluations.

30. The physical memory device of claim 23, where the identified documents further include business listings, and where the obtained data further includes at least one of:

data indicating whether the at least one search query exactly matches a name of a business in the business listings, data indicating whether a term in the at least one search query matches a suffix portion of the name of the business, or data relating to a portion of terms in the at least one search query that match the name of the business.

31. The physical memory device of claim 23, where the identified documents further include business listings, and where the obtained data further includes at least one of:

data indicating whether a term in the at least one search query matches a prefix portion of a name of a business in the business listings, data indicating whether a term in the at least one search query is a substring of the name of the business, or data indicating whether the at least one search query exactly matches the name of the business.

32. The physical memory device of claim 23, where the obtained data further includes at least one of:

data that is based on a value indicating a portion of users that selected a particular document, from the identified documents, after selecting one or more other documents from the identified documents, data relating to a number of terms in the at least one search query that match a uniform resource locator (URL) of the particular document, data representing an information retrieval score associated with the at least one search query and the particular document, or data representing a query-independent quality measure of the particular document.

33. A search engine server comprising:
a processor; and
a memory including processing instructions, which when executed by the processor, cause the processor to:
obtain data based on input document/search query pairs, where each input document/search query pair, of the input document/search query pairs, includes a search query and an input document associated with the search query, the input documents, of the input document/search query pairs, being ranked in an initial ranking order,
where the obtained data includes:
data that is based on a value indicating a portion of users that select a particular input document, from the input documents, after selecting one or more other input documents, from the input documents, and
obtain, from an evaluation model and based on the obtained data, predicted human relevance ratings to refine the initial ranking order of the input document/search query pairs, the predicted human relevance ratings predicting a level of relevance that a human user would assign the input document/search query pairs.

34. The search engine server of claim 33, where the evaluation model is trained further based on information associated with human generated metrics.

35. The search engine server of claim 34, where the information associated with the human generated metrics include information associated with a ranking, by a human evaluator, of the input document/search query pairs based on a relevance of a document to a corresponding search query.

36. The search engine server of claim 33, where the input documents comprise web documents, and
where the obtained data further includes:
a link-based value computed for a particular web document of the web documents, and
an information retrieval score associated with a particular search query and a particular web document.

37. The search engine server of claim 36, where the obtained data further includes:
data relating to a number of terms in the particular search query that match a uniform resource locator (URL) of a particular web document of the web documents.

38. The search engine server of claim 33, where the obtained data further includes:
data associated with a time between when the input documents are presented and when selection of the particular input document is detected.

39. The search engine server of claim 33, where the obtained data includes:
data that is based on a value indicating a portion of users that select the particular input document, from the input documents, before selecting another input document, from the input documents.

40. The search engine server of claim 33, where the input documents further comprise business listings, and
where the obtained data further includes at least one of:
data indicating whether a particular search query exactly matches a name of a business in the business listings,
data indicating whether a term in the particular search query matches a suffix portion of the name of the business, or
data relating to a portion of terms in the particular search query that match the name of the business.

41. The search engine server of claim 33, where the input documents further comprise business listings, and
where the obtained data further includes at least one of:
data indicating whether a term in a particular search query matches a prefix portion of a name of a business in the business listings,
data indicating whether a term in the particular search query is a substring of the name of the business, or
data indicating whether the particular search query exactly matches the name of the business.

42. A system comprising:
a memory to store instructions; and
a processor to execute the instructions to implement:
means for receiving a search query;
means for obtaining documents relevant to the search query;
means for obtaining data based on the search query and the obtained documents,
where the obtained data includes:
data that is based on a value indicating a portion of users that select a particular document, of the obtained documents before selecting any other documents of the obtained documents;
means for obtaining a predicted human relevance rating for one or more of the obtained documents based on the obtained data, the predicted human relevance rating being obtained from an evaluation model based on the obtained data and based on information associated with human generated relevance ratings; and
means for ranking the one or more of the obtained documents relevant to the search query based on the obtained predicted human relevance rating.

43. The system of claim 42, where the obtained documents correspond to business listings that are relevant to the search query.

44. The system of claim 42, where the obtained documents include web documents that are relevant to the search query.

45. The system of claim 42, where the obtained data further includes:
data that is based on a time between when the obtained documents are presented and when the particular document is selected from the obtained documents that are presented.

46. A physical memory device including instructions for execution by one or more processors, the physical memory device including:
instructions for receiving a plurality of search query/search result document pairings,
where each search query/search result document pairing, of the pairings, includes a search query and a search result document associated with the search query;
instructions for generating, for each of the pairings, a objective data derived from each of the pairings,
where the objective data, for a particular one of the pairings that comprises a particular search result document and a particular search query, includes:
first data based on a time between when search result documents, associated with the particular search query, are presented, and when the particular search result document, is selected, and
second data based on a value indicating a portion of users that select another search result document, of the search result documents associated with the particular search query, before selecting the particular search result document;

instructions for obtaining information associated with a relevance evaluation, from a human evaluator, for each of the pairings, each of the relevance evaluations measuring a relevance of a search query to a corresponding search result document, of a search query/search result document pairing; and instructions for training an evaluation model, based on the obtained information associated with the relevance evaluations and the objective data, to predict a human relevance evaluation that is used to rank additional search query/search result document pairings, where each search query/search result document pairing, of the additional search query/search result document pairings, includes a search query and a search result document.

47. The physical memory device of claim 46, where the objective data further includes:

data obtained from historical logs of search activity.

48. The physical memory device of claim 46, further including:

instructions for training the evaluation model using regression analysis techniques.

49. The physical memory device of claim 46, further including:

instructions for predicting, using the trained evaluation model, human relevance evaluations for one or more other search query/search result document pairings, where each search query/search result document pairing, of the other search query/search result document pairings, includes a search query and a search result document.

50. The physical memory device of claim 28, where the objective data further includes:

third data based on a value indicating a portion of users that select the particular search result document before selecting one or more of the search result documents associated with the particular search query.

51. The physical memory device of claim 46, where the search result documents include business listings, and where the objective data further includes:
third data indicating whether a term in the particular search query matches a prefix portion of a name of a business in the business listings,
fourth data indicating whether a term in the particular search query is a substring of the name of the business, or
fifth data indicating whether the particular search query exactly matches the name of the business.

52. The physical memory device of claim 28, where the search result documents include business listings, and where the objective data further includes:
third data indicating whether a term in the particular search query matches a prefix portion of a name of a business in the business listings,
fourth data indicating whether a term in the particular search query is a substring of the name of the business, or
fifth data indicating whether the particular search query exactly matches the name of the business.

* * * * *

UNITED STATES PATENT AND TRADEMARK OFFICE
CERTIFICATE OF CORRECTION

PATENT NO. : 8,195,654 B1
APPLICATION NO. : 11/160872
DATED : June 5, 2012
INVENTOR(S) : Michael Dennis Riley et al.

It is certified that error appears in the above-identified patent and that said Letters Patent is hereby corrected as shown below:

Claim 12, line 20 (column 12, line 47), delete "a" and insert -- an --;

Claim 16, line 8 (column 13, line 12), after "document" insert -- and --;

Claim 46, line 9 (column 16, line 57), after "pairings," delete "a";

Claim 46, line 17 (column 16, line 65), after "document" delete ",".

Signed and Sealed this
Fourth Day of September, 2012

David J. Kappos
*Director of the United States Patent and Trademark Office*